(No Model.)
H. F. HASLAM.
CHALK LINE REEL.
No. 320,555. Patented June 23, 1885.
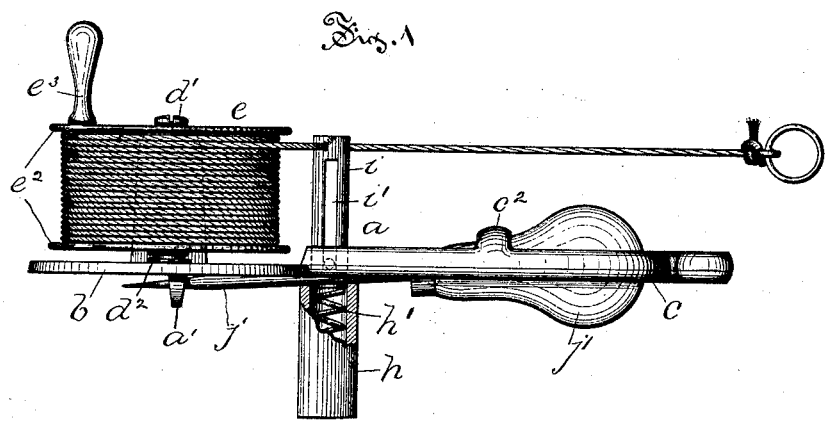
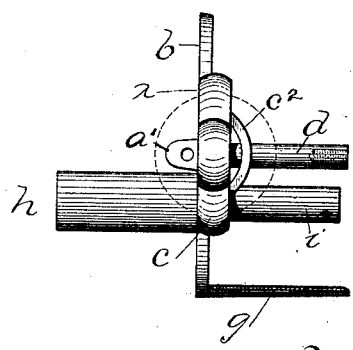
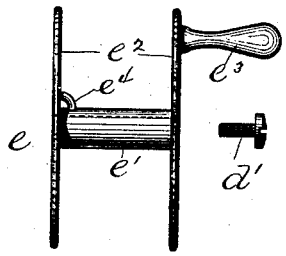
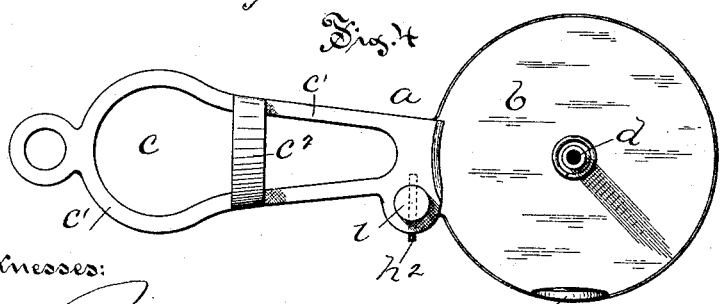
Witnesses:
W. M. Bjorkman
H. R. Williams
Inventor:
Henry F. Haslam
by Simonds & Burdett,
Attys

UNITED STATES PATENT OFFICE.

HENRY F. HASLAM, OF NEW BRITAIN, CONNECTICUT.

CHALK-LINE REEL.

SPECIFICATION forming part of Letters Patent No. 320,555, dated June 23, 1885.

Application filed April 9, 1885. (No model.)

*To all whom it may concern:*

Be it known that I, HENRY F. HASLAM, of New Britain, in the county of Hartford and State of Connecticut, have invented certain new and useful Improvements in Chalk-Line Reels, of which the following is a description, reference being had to the accompanying drawings, where—

Figure 1 is a top view of my improved chalk-line reel. Fig. 2 is an end view of the handle-frame. Fig. 3 is a side view of the reel. Fig. 4 is a side view of the handle-frame.

My invention relates to the class of devices used by carpenters, builders, and other artisans as a reel for a chalk-line; and it consists in the combination of a frame forming a handle and reel support, preferably cast to shape in one piece of metal with a reel made in one piece, and in certain details of construction of these parts, as more particularly hereinafter described.

In the accompanying drawings, the letter $a$ denotes the main frame of my improved device, that is preferably made of iron or other metal in a single casting, the disk $b$ having on one edge and in the plane of the disk a handle, $c$, and projecting at right angles from these is the axis $d$, to support the reel $e$, and preferably in line with the center of the handle. On the lower edge of the disk the shield $g$ projects below the reel and forms a sort of base or foot to hold the reel level in running out the line, and from the opposite side of the frame, at the inner end of the handle, the socket-case $h$, for the plunger-guide $i$, projects. The outline of the handle is formed of the narrow band $c'$ with the cross-bar $c^2$, that is so curved as to form a rest for the handle $j'$ of the scratch-awl $j$, that is thrust sidewise into the socket in the handle, the frame of which it fills out to a convenient size for holding in the hand. The point of the awl is first thrust through the hole in the lug $a'$, that is formed on the back of the disk and in line with the handle, and the awl is then slipped into the socket, as shown in Fig. 1. The reel $e$, with its barrel $e'$, sides $e^2$, and handle $e^3$, fast to one side, is cast of metal in one piece, the barrel being cored out so as to fit upon the axis $d$, on which it turns freely, except as held by the screw $d'$ against the pressure of the spiral spring $d^2$, that, seated between the inner side of the reel and the face of the frame $a$, forms a frictional brake to prevent the too free revolution of the reel. The eye or loop $e^4$ is cast on the barrel of the reel to provide a means for fastening the inner end of the cord, and this enables the barrel to be made thinner than is possible where the barrel is thick enough for a hole to be made through it to hold the string, as in the old forms. When the parts are put together and the cord wound upon the reel ready for use, it is passed through a hole in the outer end of the plunger-guide $i$, that moves in and out of the case $h$ across the path of the cord. The guide is seated on the spring $h'$ within the case, and is held against removal by the pin $h^2$, that passes through the frame $a$ into the long slot $i'$ in the guides. The object of this guide is to enable the user of the reel to lay the cord evenly upon the reel in winding it up, the guide being operated by the thumb of the hand holding the device in reeling, and it is also of use in running out the cord, the outer end of which is made fast, as by means of the ring or loop and a nail. As soon as a sufficient length of cord is unwound the awl is removed from its socket in the handle of the frame and used to hold the cord extended in the usual manner.

I claim as my invention—

1. In combination, a reel, $e$, and a frame, $a$, bearing an axis, $d$, and having a handle, $c$, with the laterally-open socket therein adapted to receive and hold the handle of an awl, all substantially as described.

2. In combination, a line-reel, $e$, and a frame, $a$, having a handle, $c$, an axis supporting the reel, and a guard projecting from the frame below and across the reel and adapted to form a support for the device while unreeling the cord, all substantially as described.

3. In combination, a line-reel and a frame bearing the axis supporting the reel, and having a handle with an awl-socket, and also a shoulder projecting below and across the reel and adapted to form a support for the device while unreeling the cord, and a guide for the cord attached to the frame, all substantially as described.

4. In combination, the frame $a$, having the handle $c$, with an awl-socket, the sliding cord-guide $i$, the guard $g$, projecting from the frame below and across the reel, the axis $d$, projecting from the frame parallel to the guard and supporting the reel $e$, with the spiral spring $d^2$, held between the reel and the frame, and the screw $d'$, all substantially as described.

5. In combination, a line-reel, $e$, having a barrel, $e'$, with cord-loop $e^4$ and sides $e^2$ on the barrel, and a handle, $e^3$, on one of the sides, said reel and its parts being all cast in one piece, and a metallic frame, $a$, with the axis $d$, for the reel and the guard below and on the same side as the axis, and a handle, $c$, having an awl-socket, the said frame and its parts being cast in one piece, all substantially as described.

HENRY F. HASLAM.

Witnesses:
 A. C. TANNER,
 W. M. PJOERKMON.